(12) United States Patent　　　　(10) Patent No.:　US 12,661,741 B2
Feldmann　　　　　　　　　　　　(45) Date of Patent:　　Jun. 23, 2026

(54) ADDITIVE MANUFACTURING SYSTEMS AND RELATED METHODS UTILIZING RISLEY PRISM BEAM STEERING

(71) Applicant: VulcanForms Inc., Devens, MA (US)

(72) Inventor: Martin C. Feldmann, Sudbury, MA (US)

(73) Assignee: VulcanForms Inc., Devens, MA (US)

( * ) Notice: Subject to any disclaimer, the term of this patent is extended or adjusted under 35 U.S.C. 154(b) by 1075 days.

(21) Appl. No.: 17/570,623

(22) Filed: Jan. 7, 2022

(65) Prior Publication Data

US 2022/0219260 A1　　Jul. 14, 2022

Related U.S. Application Data

(60) Provisional application No. 63/135,272, filed on Jan. 8, 2021.

(51) Int. Cl.
*B23K 26/082*　　　(2014.01)
*B22F 10/28*　　　　(2021.01)
　　　　　(Continued)

(52) U.S. Cl.
CPC ............ *B23K 26/082* (2015.10); *B22F 10/28* (2021.01); *B22F 10/366* (2021.01); *B22F 12/41* (2021.01); *B22F 12/90* (2021.01); *B23K 26/0652* (2013.01); *B23K 26/342* (2015.10); *B23K 26/703* (2015.10); *B23K 26/705* (2015.10);
　　　　　(Continued)

(58) Field of Classification Search
None
See application file for complete search history.

(56) References Cited

U.S. PATENT DOCUMENTS 6,258,327 B1　　7/2001　Tatum
9,956,612 B1　　5/2018　Redding et al.
　　　　　(Continued)

FOREIGN PATENT DOCUMENTS

EP　　　　3 521 028 A1　　8/2019
WO　　WO 2016/051163 A1　　4/2016
　　　　　(Continued)

OTHER PUBLICATIONS

International Search Report and Written Opinion mailed Apr. 7, 2021 for International Application No. PCT/US2021/016143.
　　　　　(Continued)

*Primary Examiner* — Robert G Bachner
(74) *Attorney, Agent, or Firm* — Wolf, Greenfield & Sacks, P.C.

(57)　　　　　　ABSTRACT

Additive manufacturing systems and related methods are disclosed. In some embodiments, an additive manufacturing system includes a build surface, one or more laser energy sources configured to emit laser energy, an optical phased array operatively coupled to the one or more laser energy sources, and a Risley prism assembly comprising a plurality of wedge prisms. The optical phased array includes one or more phase shifters operatively coupled to the one or more laser energy sources and configured to control a phase of the laser energy. The optical phased array is configured to direct the laser energy towards the Risley prism assembly, and the Risley prism assembly is configured to direct the laser energy towards the build surface.

12 Claims, 7 Drawing Sheets

(51) Int. Cl.

| | |
|---|---|
| *B22F 10/366* | (2021.01) |
| *B22F 12/41* | (2021.01) |
| *B22F 12/90* | (2021.01) |
| *B23K 26/064* | (2014.01) |
| *B23K 26/342* | (2014.01) |
| *B23K 26/70* | (2014.01) |
| *B33Y 10/00* | (2015.01) |
| *B33Y 30/00* | (2015.01) |
| *B33Y 50/02* | (2015.01) |
| *G02B 26/08* | (2006.01) |
| *G02F 1/295* | (2006.01) |

(52) U.S. Cl.
CPC ............... *B33Y 10/00* (2014.12); *B33Y 30/00* (2014.12); *B33Y 50/02* (2014.12); *G02B 26/0891* (2013.01); *G02F 1/2955* (2013.01)

(56) References Cited

U.S. PATENT DOCUMENTS

| | | | |
|---|---|---|---|
| 10,022,795 B1 | 7/2018 | Redding et al. | |
| 2005/0288745 A1* | 12/2005 | Andersen | A61F 9/00781 |
| | | | 607/86 |
| 2009/0323203 A1 | 12/2009 | Adams et al. | |
| 2010/0231909 A1* | 9/2010 | Trainer | G01N 15/042 |
| | | | 356/336 |
| 2013/0188181 A1* | 7/2013 | Angel | G01J 3/4531 |
| | | | 356/301 |
| 2013/0216836 A1 | 8/2013 | Grebe et al. | |
| 2013/0242123 A1* | 9/2013 | Norman | H04N 23/6812 |
| | | | 348/208.14 |
| 2016/0067820 A1 | 3/2016 | Mironets et al. | |
| 2016/0158889 A1 | 6/2016 | Carter et al. | |
| 2016/0223323 A1* | 8/2016 | Stacey | G01B 11/303 |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2017/0120332 A1* | 5/2017 | DeMuth | B22F 12/30 |
| 2018/0117837 A1 | 5/2018 | Reese et al. | |
| 2018/0200792 A1 | 7/2018 | Redding et al. | |
| 2018/0207722 A1 | 7/2018 | Feldmann et al. | |

| | | |
|---|---|---|
| 2018/0236549 A1 | 8/2018 | Spears et al. |
| 2019/0009369 A1 | 1/2019 | Vorontsov |
| 2019/0134706 A1 | 5/2019 | Shafir |
| 2019/0143406 A1 | 5/2019 | Carter et al. |
| 2019/0299286 A1 | 10/2019 | Feldmann et al. |
| 2020/0023467 A1 | 1/2020 | Hunze et al. |
| 2020/0039000 A1 | 2/2020 | Sweetland |
| 2020/0108465 A1 | 4/2020 | Sweetland |
| 2020/0122394 A1 | 4/2020 | Sheng et al. |
| 2020/0156310 A1 | 5/2020 | Shah et al. |
| 2020/0230745 A1 | 7/2020 | Komsta et al. |
| 2020/0376761 A1 | 12/2020 | Sweetland |
| 2021/0339318 A1 | 11/2021 | Dunbar et al. |
| 2022/0009030 A1 | 1/2022 | Dadelszen et al. |
| 2023/0056367 A1 | 2/2023 | Leonardo et al. |

FOREIGN PATENT DOCUMENTS

| | | |
|---|---|---|
| WO | WO 2017/015241 A1 | 1/2017 |
| WO | WO 2019/092702 | 5/2019 |
| WO | WO 2025/006255 A2 | 1/2025 |

OTHER PUBLICATIONS

International Search Report and Written Opinion mailed Apr. 4, 2022 for International Application No. PCT/US2022/011577.

[No Author Listed] Excalibur (Archived). Defense Advance Research Projects Agency. Publicly available at least as early as Feb. 18, 2020. 3 pages.

Heck, Highly integrated optical phased arrays: photonic integrated circuits for optical beam shaping and beam steering. Nanophotonics. Jan. 6, 2017;6(1):93-107.

Notaros et al., Near-field-focusing integrated optical phased arrays. Journal of Lightwave Technology. Dec. 15, 2018;36(24):5912-20.

Roberts, Internally Sensed Optical Phased Arrays. Australian National University Thesis Submitted for Doctor of Philosophy. Jul. 5, 2016, 166 pages.

Shaddock, Laser beam steering subsystem—an optical phased array. Australian National University Department of Quantum Science Centre for Gravitational Physics. https://physics.anu.edu.au/quantum-egp-research/spacetech/gracefo/optical-phased-array.php. Updated Jan. 15, 2019, 2 pages.

\* cited by examiner

550

514

502

512

500

520a

509a — 510a

508a

521a

509b — 510b

508b

509c — 510c

508c

509d — 510d

508d

504

506

502

503

606

610

ADDITIVE MANUFACTURING SYSTEMS AND RELATED METHODS UTILIZING RISLEY PRISM BEAM STEERING

RELATED APPLICATIONS

This application claims the benefit of priority under 35 U.S.C. § 119(e) of U.S. Provisional Application Ser. No. 63/135,272, filed Jan. 8, 2021, the disclosure of which is incorporated herein by reference in its entirety.

FIELD

Disclosed embodiments are related to additive manufacturing systems and related methods utilizing Risley prism beam steering.

BACKGROUND

Powder bed fusion processes are an example of additive manufacturing processes in which a three-dimensional shape is formed by selectively joining material in a layer-by-layer process. In metal powder bed fusion processes, one or multiple laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

SUMMARY

In some embodiments, an additive manufacturing system includes a build surface, one or more laser energy sources configured to emit laser energy, an optical phased array operatively coupled to the one or more laser energy sources, and a Risley prism assembly comprising a plurality of wedge prisms. The optical phased array includes one or more phase shifters operatively coupled to the one or more laser energy sources and configured to control a phase of the laser energy. The optical phased array is configured to direct the laser energy towards the Risley prism assembly, and the Risley prism assembly is configured to direct the laser energy towards the build surface.

In some embodiments, a method for additive manufacturing includes emitting laser energy from a plurality of laser energy sources, controlling a phase of the laser energy emitted by each one of the plurality of laser energy sources to control a shape of at least one laser beam directed onto a build surface, and adjusting a position of the at least one laser beam on the build surface with one or more wedge prisms.

In some embodiments, an additive manufacturing system includes a build surface, one or more laser energy sources configured to emit laser energy, an optical phased array operatively coupled to the one or more laser energy sources, and a Risley prism assembly configured to control a position of at least one laser beam on the build surface. The optical phased array is configured to control a shape of at least one laser beam directed onto a build surface.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
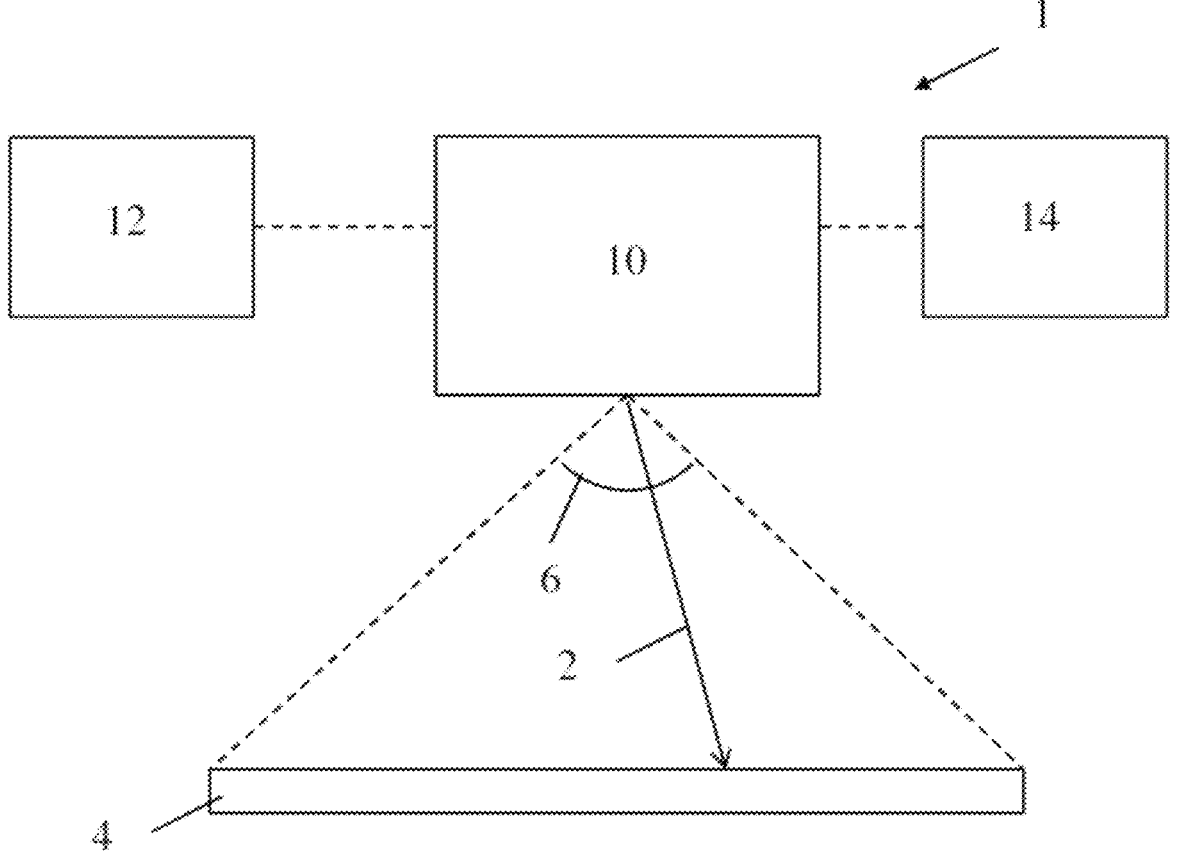
FIG. 1 is a schematic representation of one embodiment of an additive manufacturing system including an optical phased array assembly.

The inventors have recognized and appreciated numerous benefits associated with additive manufacturing systems that utilize one or more optical phased arrays configured to perform one or more aspects of beam steering during an additive manufacturing process. As used herein, an optical phased array (OPA) refers to an array of light emitters (e.g., laser emitters) arranged in a one or two dimensional array that each emit light having the same frequency. A phase shifter is associated with each emitter and, each phase shifter is configured to control the phase of the light emitted by its associated emitter. By controlling the phase of light emitted from each emitter, a beam formed from a superposition of light from the array of emitters can be steered and/or shaped on a build surface (e.g., a powder bed) as desired. As described in more detail below, such control of the phase shifters may be performed at high frequencies, and thus an OPA may allow for high accuracy and high speed scanning of one or more laser beams without requiring any physical movement of the emitters.

According to some aspects, beam steering speeds achievable with an OPA may be orders of magnitude faster than those possible using conventional approaches, which may enable generally higher throughput additive manufacturing processes, and also may enable scanning strategies that are not possible using existing approaches, such as galvo- or gantry-based approaches. For example, in some embodiments, a laser beam may be steered by an OPA on time scales that are much faster than those relevant to the kinetics of thermal transport and melting in a powder bed, and in this manner, a laser beam may be steered fast enough to effectively project an image of laser energy onto a build surface. Additionally, a laser beam may be shaped or otherwise controlled dynamically during an additive manufacturing process, such that the beam shape may be continually modified while scanning. This ability control a shape of the beam during a scanning operation to be a shape other than a Gaussian may be beneficial for different modes of weld formation. Additionally, an OPA-based beam steering system may enable an additive manufacturing process in which a large number of discrete melt pools may be formed simultaneously on the build surface without sacrificing feature resolution. Moreover, the high scanning speeds achievable using an OPA-based beam steering system may allow for laser power to be distributed as desired across the build surface, which may allow for more even heating of the part being formed. For example, the beam may be scanned such that no single spot is exposed to too much laser power (which may cause undesirable defects such as keyhole porosity or other effects).

While an OPA-based beam steering system may enable beam shaping as well as fast and accurate scanning, the area over which an OPA-based system scans may be limited by the relatively modest steering angle of an OPA. The relatively small scan area of an OPA-based system may be limiting for certain applications. However, the inventors have recognized and appreciated the benefits associated with using an OPA in conjunction with other types of scanning arrangements. For example, in some embodiments, a Risley prism-based system may be utilized to perform gross scanning over large areas, while an OPA may be utilized for finer scale scanning of a beam, as explained in more detail below. In one such embodiment, a plurality of laser sources may be coupled with one or more optical phased arrays and one or more Risley prism assemblies may be used to perform large scale scanning of the resulting patterns on the build surface at a size scale that is larger than a size scale of the scanning range of the associated OPA.

The inventors have recognized and appreciated certain additional benefits of using a Risley prism-based system to perform gross scanning. Using a Risley prism-based system may be advantageous in its ability to transmit high power laser energy. The wedges of a Risley prism include transmissive elements such as glass, sapphire, and/or any other suitable transparent base material, which may optionally be combined with one or more high-power coatings. Compared to reflective optical elements (e.g., mirrors of a galvanometer assembly), transmissive elements may be configured to tolerate much higher laser powers. That is, whereas a mirror-based system may be more limited in regard to its maximum achievable laser power, a Risley prism-based system may not be so limited. However, it should be appreciated that using the systems described herein in conjunction with galvanometer assemblies, gantry assemblies, and other beam steering systems is also contemplated, and the disclosure is not limited in this regard. Additionally, using a Risley prism-based system may be advantageous in its ability to transmit laser energy with higher precision and fidelity. For example, the wedges of a Risley prism may be planar elements. As such, the wedges may direct the individual wavefronts emitted by an optical phased array in the same direction. In contrast, conventional beam forming optics (e.g., telescope assemblies) may direct the individual wavefronts in different directions based on where each wavefront contacts the lens.

In some embodiments, an OPA may be arranged in series with a Risley prism assembly, such that laser beams output from the OPA are directed toward the Risley prism assembly. Small scale adjustments made by the OPA may be coordinated with large scale adjustments made by the Risley prism assembly to enable highly accurate, high speed scanning and/or beam shaping of the one or more laser beams over a large area of a build surface of an additive manufacturing system.

A Risley prism assembly may include one or more wedge prisms configured to adjust an angle of a beam relative to a build surface. A wedge prism may include an input surface and an output surface opposite the input surface and oriented at an angle relative to the input surface. Without wishing to be bound by theory, light passing through a wedge prism may be refracted due to the angular difference between the input and output surfaces. Additionally in some embodiments, the input and output surfaces of a wedge prism may be planar.

Each wedge prism of a Risley prism assembly may be coupled to an actuator, such that actuating the actuator may rotate the wedge prism. Appropriate actuators include but are not limited to brushless DC motors, brushed DC motors, stepper motors, and servomotors. In the various embodiments disclosed herein, a wedge prism may be configured to rotate about an axis perpendicular to its input surface; an axis perpendicular to its output surface; an axis perpendicular to a build surface an axis perpendicular to an output surface of an OPA assembly; combinations of the forgoing and/or any other appropriate axis of rotation as the disclosure is not limited in this regard.

As the wedge prism is rotated, the direction of light exiting the wedge prism may rotate as well. By adjusting the angle at which the light exits the wedge prism, the location at which the light strikes a surface downstream from the wedge prism may be controlled. Without wishing to be bound by theory, if the position at which light strikes an input surface of a wedge prism remains constant, rotating the wedge prism may cause light passing through the wedge prism and out of the output surface of the wedge prism to trace a circle on a surface downstream from the wedge prism.

By combining two or more wedge prisms serially, a Risley prism assembly may be configured to produce complex paths of light. For example, laser energy output from an OPA may pass through a first wedge prism of a Risley prism assembly, thereby refracting the laser energy. After passing through the first wedge prism, the laser energy may contact an input surface of a second wedge prism. The location at which the laser energy contacts the input surface of the second wedge prism may be based at least in part on the angular position of the first wedge prism (as determined by how much an actuator rotates the first wedge prism), the angle of refraction of the laser energy as it passes through the first wedge prism (as determined by the relative angle of the input and output surfaces of the first wedge prism), and a distance between the first wedge prism and the second wedge prism. The laser energy may then pass through the second wedge prism, again refracting the laser energy. In this way, the laser energy may be continually refracted by each wedge prism of the Risley prism assembly, until the laser energy reaches the build surface. By actuating actuators associated with one or more of the wedge prisms of the Risley prism assembly, the wedge prisms may be rotated and the laser energy may be steered on the build surface.

Generally, the term "Risley prism assembly" is not limited to any specific number or arrangement of wedge prisms, and it should be appreciated that a Risley prism assembly may include any suitable number of wedge prisms or other optical elements. As used herein, the term "Risley prism pair" refers to a pair of wedge prisms. That is, "Risley prism pair" refers to a Risley prism assembly with two wedge prisms. As used herein, the term "dual Risley prism pair" refers to two Risley prism pairs, which, accordingly, includes four wedge prisms.

It should be appreciated that wedge prisms of a Risley prism assembly may be rotated in any suitable direction at any suitable speed, as the disclosure is not limited in this regard. For example, if a Risley prism assembly includes two wedge prisms, the two wedge prisms may be rotated in the same direction and/or in opposite directions about a common axis of rotation. Additionally, each of the two wedge prisms may be rotated at any suitable speed, independent of the speed at which the other of the two wedge prisms is rotated.

As described above, the wedge prisms of a Risley prism assembly may be transmissive elements that include glass and/or high-power coatings. Without wishing to be bound by theory, the material of a wedge prism may be selected based, at least in part, on the transmissive properties of the material. For example, it may be desirable for a wedge prism to transmit and/or refract laser energy without absorbing undesirable levels of energy that would heat the wedge prism. In some embodiments, wedge prisms may be made from glass. In some embodiments, wedge prisms may be made from fused quarts materials. Non-limiting examples of appropriate materials include Corning 7980, Corning 7979, materials from Heraeus Infrasil, and/or materials from Suprasil. In some embodiments, wedge prisms may be made from sapphire. In some embodiments, a base material of a wedge prism may be coated. Coatings may be applied using sputtering, ion beam sputtering, ion beam magnetron sputtering, evaporative methods, and/or any other suitable method to apply a coating to a transparent base material. Of course, it should be appreciated the wedge prisms of a Risley prism assembly may be made of other suitable materials, and that the disclosure is not limited in this regard.

In some embodiments, an additive manufacturing system may include one or more laser energy sources coupled to an OPA. The OPA may be positioned over a build surface (e.g., a powder bed comprising metal or other suitable materials) of the additive manufacturing system and the OPA may be configured to direct laser energy from the one or more laser energy sources towards the build surface and scan the laser energy in a desired shape and/or pattern along the build surface to selectively melt and fuse material on the build surface. In some embodiments, a Risley prism assembly may be positioned after or downstream of the OPA and configured to further adjust a position of the laser energy output from the OPA on the build surface.

In some embodiments, an OPA may be formed from an array of optical fibers having emission surfaces directed towards a powder bed. For example, the array of optical fibers may have ends secured in a fiber holder constructed and arranged to maintain the fibers in a desired one or two dimensional pattern. However, it should be appreciated that an array of optical fibers may have emission surfaces directed in directions other than towards a powder bed, as the disclosure is not limited in this regard since a direction of light emitted by the fibers may be reoriented using one or more mirrors, prisms, lenses, or other appropriate light directing component. In some instances, each optical fiber may be coupled to an associated laser energy source. Alternatively, one or more laser energy sources may be coupled to a splitting structure to couple laser energy from the laser energy sources to the array of optical fibers. Each optical fiber in the array of optical fibers may be coupled to an associated phase shifter though embodiments in which the laser energy emitted by the array of optical fibers is optically coupled to the associated phase shifters may also include free space optical connections as the disclosure is not limited to how the laser energy sources are coupled to the phase shifters. In some embodiments, the phase shifters may be piezoelectric phase shifters constructed and arranged to stretch a portion of an associated optical fiber in response to an electrical signal to change the phase of the laser energy emitted from the fiber. As described below, in some embodiments, a system may further include one or more sensors configured to detect a phase of laser energy emitted from each fiber in the array, which may be used in a feedback control system used to control one or more beams formed and scanned by the OPA.

In some embodiments, an OPA may be formed using free-space phase shifters. For example, an array of laser energy pixels may be projected from an array of optical fibers. The array of laser energy may be directed, shaped, and/or focused towards an array of free space optical shifters using one or more mirrors, lenses, prisms, or other optical elements, and a phase of each laser energy pixel may be controlled when passing through the free-space phase shifter, such that a superposition of the phase-shifted laser energy pixels exiting the phase shifters forms one or more laser energy beams that is steered, shaped, and/or controlled as desired.

In some embodiments, one or more OPAs may be formed on a semiconductor substrate. For example, a semiconductor substrate (e.g., a silicon wafer) may have a plurality of waveguides formed thereon, and each waveguide may terminate in an emitter constructed and arranged to emit light (e.g., laser energy) from the semiconductor substrate. Depending on the particular embodiment, the emitters may be formed as so-called vertical emitters, such as grating emitters that emit light substantially perpendicular to the semiconductor substrate, or edge emitters that are configured to emit light out of an edge of the semiconductor substrate. In the case of edge emitters, in some embodiments, multiple edge-emitting structures may be stacked to form a two dimensional array. Moreover, each emitter may have an associated phase modulating structure formed on the semiconductor substrate, and the phase modulating structures may be controlled to control a phase of light emitted by each emitter, thereby allowing for control of the resulting beam(s) emitted by the OPA. The waveguides formed on the semiconductor substrate may be optically coupled to one or more light sources, such as one or more high power laser energy sources, and the waveguides may transmit the light through the semiconductor substrate to the emitters. In some instances, one or more splitting structures may be formed on the semiconductor substrate to divide light coupled to the semiconductor substrate among a plurality of emitters. It should be appreciated that the above-described semiconductor structures may be manufactured and arranged in any suitable manner. For example, lithographic processes as are known in the art may be used, though any appropriate method of manufacturing the described structures may be used as the disclosure is not so limited.

In some instances, an OPA formed on a semiconductor substrate may undesirably absorb heat while laser energy is transmitted through the waveguides and/or when the laser light is emitted from the emitters (e.g., due to transmission losses and/or emission of light towards the substrate). Such heat may result in damage to the semiconductor structures, especially at laser power levels suitable for additive manufacturing processes. Accordingly, in some embodiments, a semiconductor substrate having an OPA structure formed thereon may be coupled to a cooling structure, such as a heatsink or cooling plate that may be configured to actively cool the semiconductor substrate and OPA structures. For example, an OPA assembly, or a substrate (e.g. a semiconductor substrate) including a portion of the OPA assembly, may be mounted on the cooling structure.

According to some aspects, the inventors have appreciated that it may be desirable to control a spacing of emitters in an OPA. For example, and without wishing to be bound by any particular theory, it may be desirable to maintain a spacing between adjacent emitters to be approximately half of the wavelength of the light emitted from the OPA in order to reduce undesirable side or grating lobes that can form when emitters of a phased array are separated by larger distances. Accordingly, in some embodiments, an OPA according to the present disclosure may have an emitter spacing selected based on the wavelength of laser energy used in an additive manufacturing process. For example, in some instances, laser energy may have wavelength of approximately one micrometer, and thus an OPA may be configured to have emitters spaced approximately 0.5 microns from one another.

Depending on the particular embodiment, the phase shifters of an OPA may be operatively coupled to a controller configured to control the phase of light emitted by each emitter of the OPA. In some instances, each phase shifter may be capable of operating at very high frequencies, such as frequencies of hundreds of MHz to several GHz. Accordingly, the controller may be configured for sending high frequency control signals to operate the phase shifters and steer and/or shape one or more beams emitted by the OPA. For example, in some embodiments, a controller may include one or more field programmable gate array (FPGA) structures operatively coupled to the phase shifters. In one exemplary embodiment, an OPA formed on a semiconductor substrate may include one or more FPGA structures formed on the same semiconductor substrate and coupled to the phase shifters of the OPA via interconnects formed on the substrate. In this manner, the OPA and controller may be formed as a single integrated device on a semiconductor substrate. In some embodiments, one or more actuators of a Risley prism assembly may be operatively coupled to a controller. In some embodiments, a single controller may be configured to control both an OPA and a Risley prism assembly to coordinate the beam adjustments associated with the OPA and the beam adjustments associated with the Risley prism assembly. However, the use of separate controllers for the various components described herein are also contemplated.

As used herein a controller may refer to one or more processors that are operatively coupled to non-transitory processor readable memory that includes processor executable instructions that when executed cause the various systems and components to perform any of the methods and processes described herein. It should be understood that any number of processors may be used such that the processes may be executed on a single processor or multiple distributed processors located at any appropriate location including either within an additive manufacturing system and/or at a location that is remote from the additive manufacturing system performing the desired operations as the disclosure is not limited in this fashion.

In some embodiments, a scanning speed of an additive manufacturing system including an OPA assembly and a Risley prism assembly may depend at least in part on the individual scanning speeds of the OPA assembly and the Risley prism assembly. As described above, phase shifters of an OPA assembly may be capable of operating at very high frequencies, such as maximum operational frequencies between or equal to 1 MHz and 100 GHz. A Risley prism assembly may scan at any appropriate speed for a desired application, where the speed may depend at least in part on motor specifications, wedge weight, wedge inertia, and/or beam position. While a Risley prism assembly itself may be capable of scanning at high speeds, the Inventors have recognized that, without an OPA assembly, a lone Risley prism assembly may be limited. To achieve complex beam paths using a lone Risley prism assembly (i.e., not in conjunction with an OPA assembly), the laser energy may need to be turned on and off at very high frequencies. Coordinating the timing between modulating the laser energy and adjusting the Risley prism may present certain challenges. Additionally, turning the laser energy on and off at high frequencies may be associated with power profiles and pulse energies that may be undesirable. However, the Inventors have appreciated that using an OPA assembly in conjunction with a Risley prism assembly may enable beam shaping with extremely high speeds and favorable power profiles.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an additive manufacturing system 1 including an OPA assembly 10 constructed and arranged to steer a laser energy beam 2 along a build surface 4. As illustrated, the OPA may be arranged to direct the beam within an angular scanning range 6, which may be up to 40 degrees, up to 60 degrees, up to 90 degrees, up to 120 degrees, up to 150 degrees or more. As noted above, the OPA may steer the beam via control of high frequency phase shifters in the OPA, and thus an effective scanning speed of the beam on the build surface 4 may be greater than 10 m/s, greater than 50 m/s, greater than 100 m/s, greater than 1000 m/s or more. In some embodiments, an effective scanning speed of the beam on the build surface 4 may be less than 10,000 m/s, less than 1000 m/s, less than 100 m/s, or less than 50 m/s. As a result, the OPA may allow the beam to be scanned such that it defines an image or pattern that is effectively static on timescales relevant for powder fusion processes (e.g., melting and solidification of metal powder).

Given the relatively high speeds that a laser beam may be scanned across the surface of a powder bed, the formation process may function somewhat similarly to an electron beam based powder bed based machine. Specifically, one or more laser beams may be scanned across a powder bed in a pattern and at a speed such that one or more corresponding melt fronts do not proceed along the primary direction of motion of the one or more laser beams. Instead, the melt from may travel along the secondary direction of motion, i.e. in the direction of motion of the image being created by one or more beams being scanned across the powder bed. This may be beneficial as compared to typical laser based systems in that it may be possible to expose relative large areas, bring in more power than with a single spot, and provide more uniform thermal heating of the part being formed. However, while specific scanning speeds of a laser across a powder bed surface are mentioned above, scanning speeds both greater than and less than those noted above are contemplated as the disclosure is not limited in this fashion.

As illustrated, the OPA assembly 10 may be optically coupled to one or more laser energy sources 12 (e.g., via one or more optical cables), as well as operatively coupled to a controller 14 configured to control the phase shifters of the OPA to steer and/or shape the beam 2. As noted above, in some instances, the controller may comprise a high speed FPGA coupled to the phase shifters to enable high frequency operation and control of the OPA. Further, a controller as described herein may include one or more processors and associated non-transitory processor readable memory or other media storing instructions that when executed by the one or more processors may control the systems and components described herein to perform the disclosed methods and operations.

Figure 2:
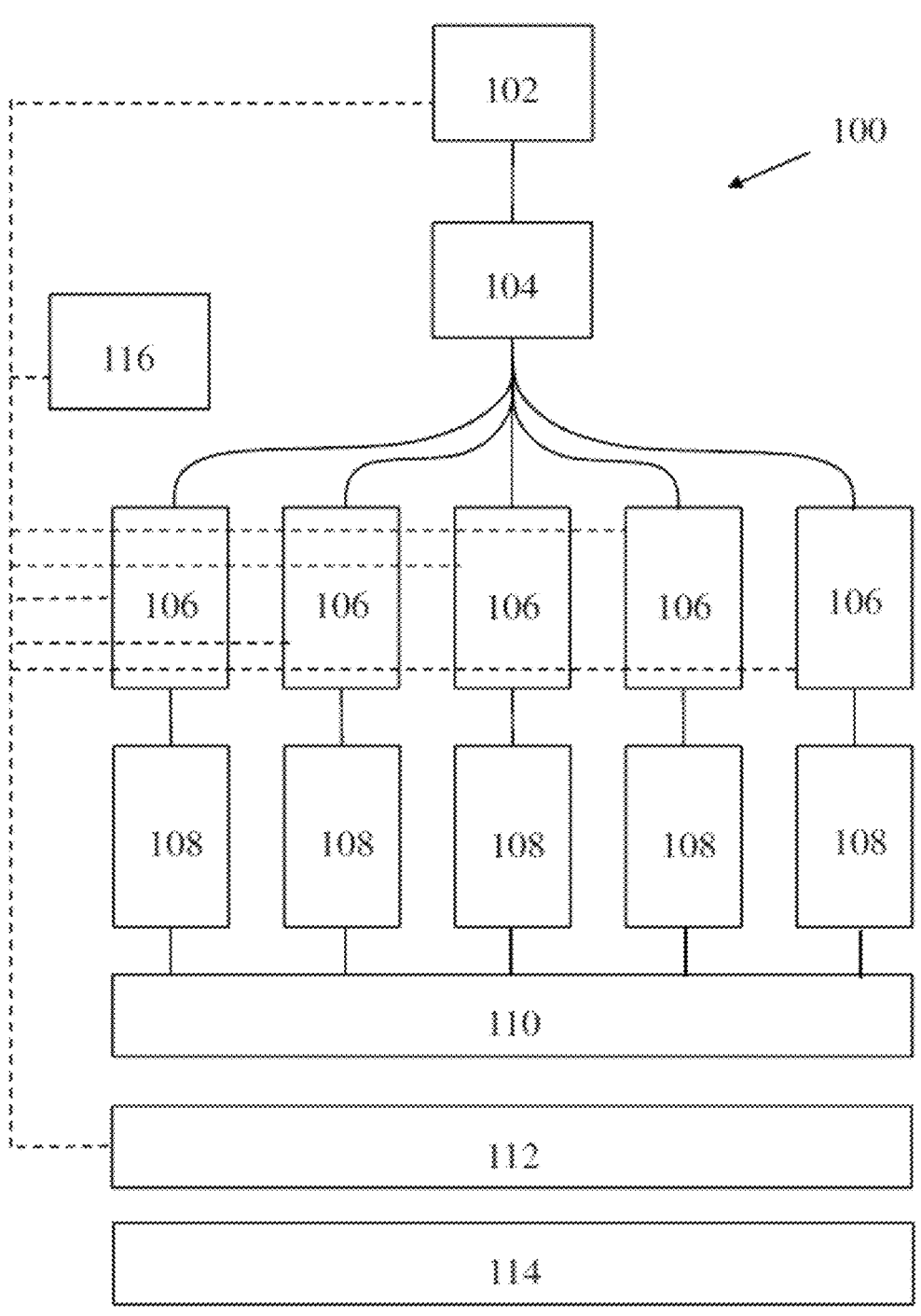
FIG. 2 depicts one embodiment of an optical phased array assembly for use in an additive manufacturing system.

FIG. 2 depicts one embodiment of an OPA assembly 100 that may be used to direct laser energy onto a build surface of an additive manufacturing system. The system includes a laser energy source 102, which may be referred to as a seed laser. Laser energy is transmitted from the source 102 to a coupler 104 that splits the laser energy to a plurality of optical fibers which transmit the laser energy to a plurality of fiber phase shifters 106, such as piezoelectric fiber phase modulators stretchers arranged to stretch optical fibers to modulate a phase of the laser energy passing through the fibers. Prior to entering the phase shifters, the laser energy in each fiber, or that is transmitted along a different optical path, may be substantially in phase with one another and may have the same wavelength, or range of wavelengths. Once the laser energy passes through the phase shifters, the modulated (i.e., phase shifted) laser energy is then transmitted through a plurality of amplifiers 108 configured to amplify the power of the laser energy to a desired power level (e.g., a power level suitable for a powder fusion process). Ends of the optical fibers coming out of the amplifiers 108 are received in a fiber holder 110, which may be constructed and arranged to arrange the fiber ends to form a desired pattern of laser energy emitters, such as a one or two dimensional array. The fiber holder may be constructed in any appropriate fashion to arrange the fibers in a desired pattern. For example, a plate, or other structure may include a plurality of precision drilled holes that the optical fibers may be individually connected to in order to arrange the optical fibers in the desired pattern, though other constructions of a fiber holder may also be used as the disclosure is not so limited. In some embodiments the fibers may include multiple cores which may further decrease the emitter spacing in some applications.

In some embodiments, the OPA assembly may further include a phase detector 112 to detect a phase of laser energy emitted from the optical fibers held in the fiber holder 110, which may be used in a feedback control system as noted below. Depending on the embodiment, the feedback control may either be implemented using one or more sensors located internal or external to the OPA assembly as the disclosure is not limited to how the feedback control is implemented. Moreover, in some embodiments, laser energy transmitted out of the fiber holder 110 may pass through one or more optical elements 114 such as lenses before being directed to a build surface. As illustrated, a controller 116 is coupled to the laser energy source 102, the phase shifters 106, and the phase detector. The control may control operation of each of these components to achieve a desired shape and/or pattern of laser energy that is emitted towards a build surface from the fiber holder 110 and through the optical elements 114 (if included). In some embodiments, the controller may utilize an active feedback scheme to control the phase of laser energy passing through each phase shifter 106 based on the phase measured with the detector 112.

Figure 3:
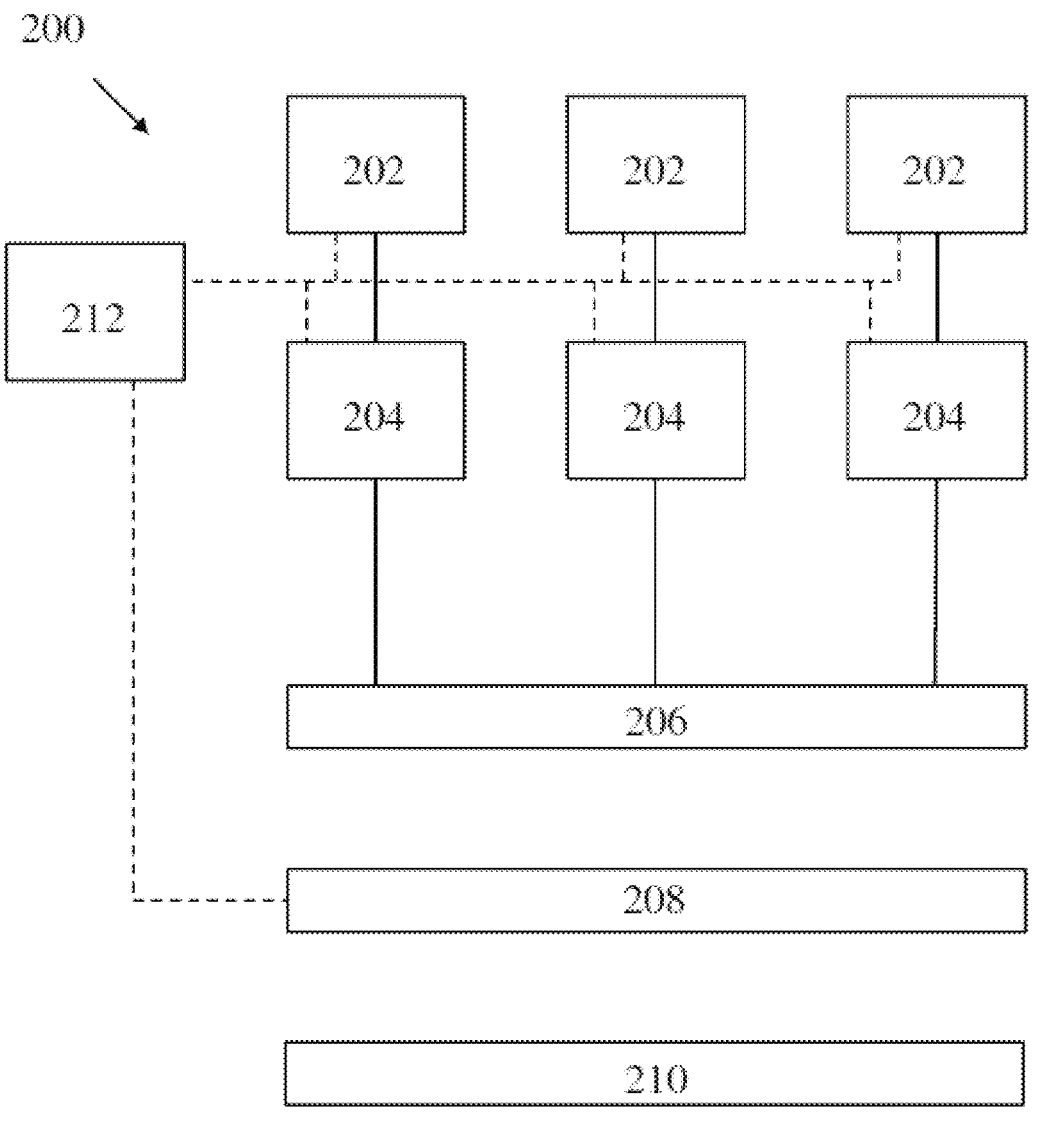
FIG. 3 depicts another embodiment of an optical phased array assembly for use in an additive manufacturing system.

FIG. 3 depicts another embodiment of an OPA assembly 200. Similar to the embodiment described previously, the OPA assembly 200 includes a fiber holder 206 constructed and arranged to hold ends of optical fibers in a desired pattern of laser energy emitters, such as a one or two dimensional array. However, in this embodiment, each emitter of the array has an associated laser energy source 202, rather than utilizing a single laser energy source that is subsequently split. In particular, the OPA assembly 200 includes a plurality of laser energy sources 202 which are coupled to phase shifters 204, and subsequently to the fiber holder 206. Similar to the above-described embodiment, a phase detector 208 may detect a phase of laser energy emitted from the emitters held in the fiber holder 208 for use in a feedback control scheme, and the assembly may further include one or more optical elements 210 between the fiber holder 206 and a build surface. Moreover, a controller 212 is operatively coupled to the laser energy sources 202, phase shifters 204, and phase detector 208.

Figure 4:
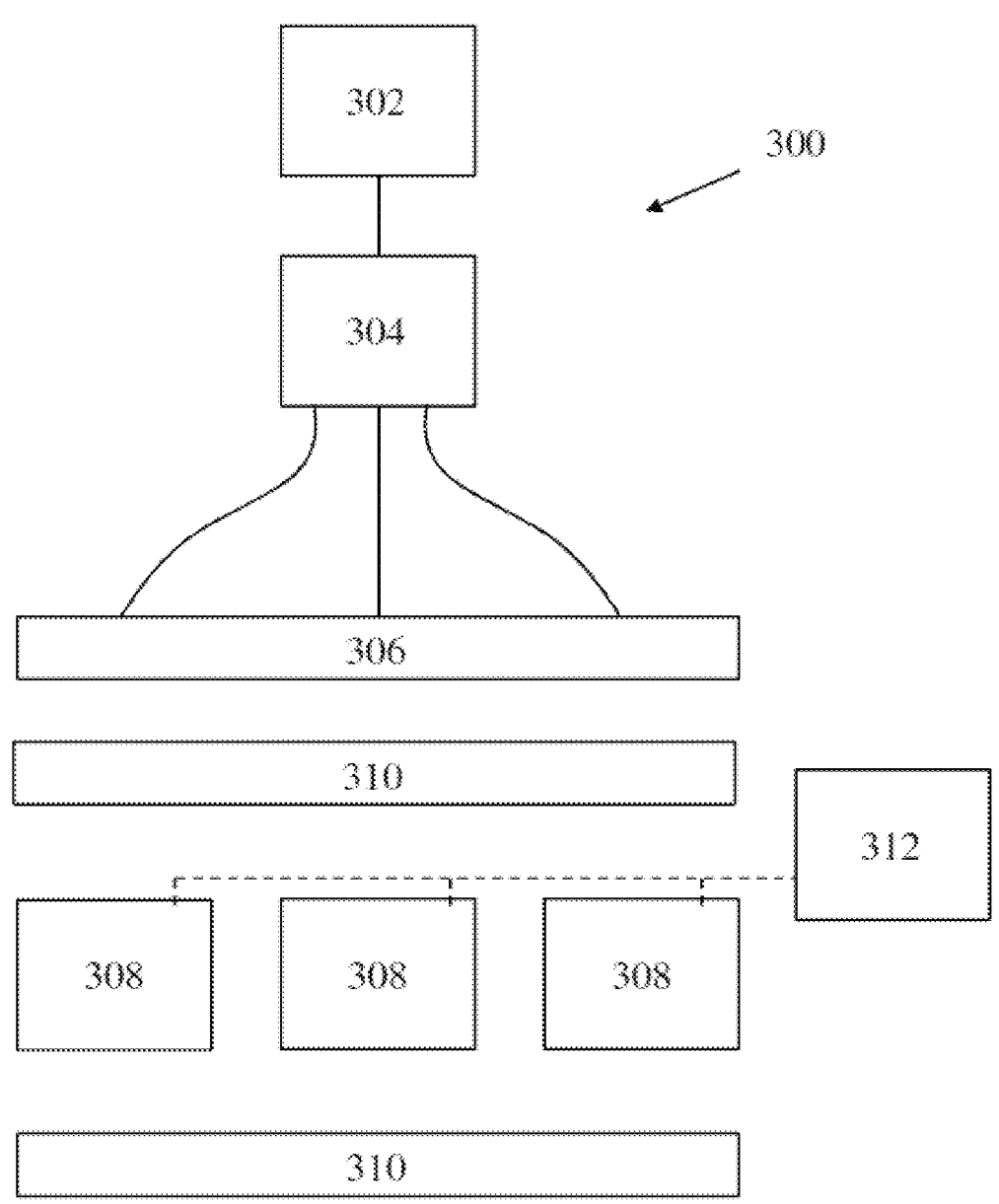
FIG. 4 depicts yet another embodiment of an optical phased array assembly for use in an additive manufacturing system.

FIG. 4 depicts a further embodiment of an OPA assembly 300. In this embodiment, laser energy from a laser energy source 302 is split and coupled to a fiber holder 306 via a coupler 304. Similar to the embodiments described above, the fiber holder may define an array of laser energy emitters. In this embodiment, laser energy may be emitted from the array of emitters and subsequently pass through a plurality of free-space phase shifters 308 configured to modulate the phase of the laser energy and steer and/or shape a resulting beam of laser energy. As illustrated, the phase shifters may be positioned between optical elements 310 such as lenses that may focus and/or direct the laser energy from the fiber holder 306 into the phase shifters 308. In some instances, these optical elements may be configured to shape the laser energy emitted from the fiber holder 306 to reduce a spacing between adjacent laser energy wavefronts emitted from the fiber holder prior to undergoing phase shifting via the free space phase shifters 308. In some cases, the spacing may be reduced to about one half of the wavelength of the laser energy, which may aid in reducing undesirable side lobes as discussed above. The phase shifters 308 may be operatively coupled to a controller 312 to control the phase of the laser energy passing through each phase shifter to steer and/or shape a resulting laser energy beam. In some instances, one or more additional optical elements 310 may be positioned after the phase shifters.

Figure 5:
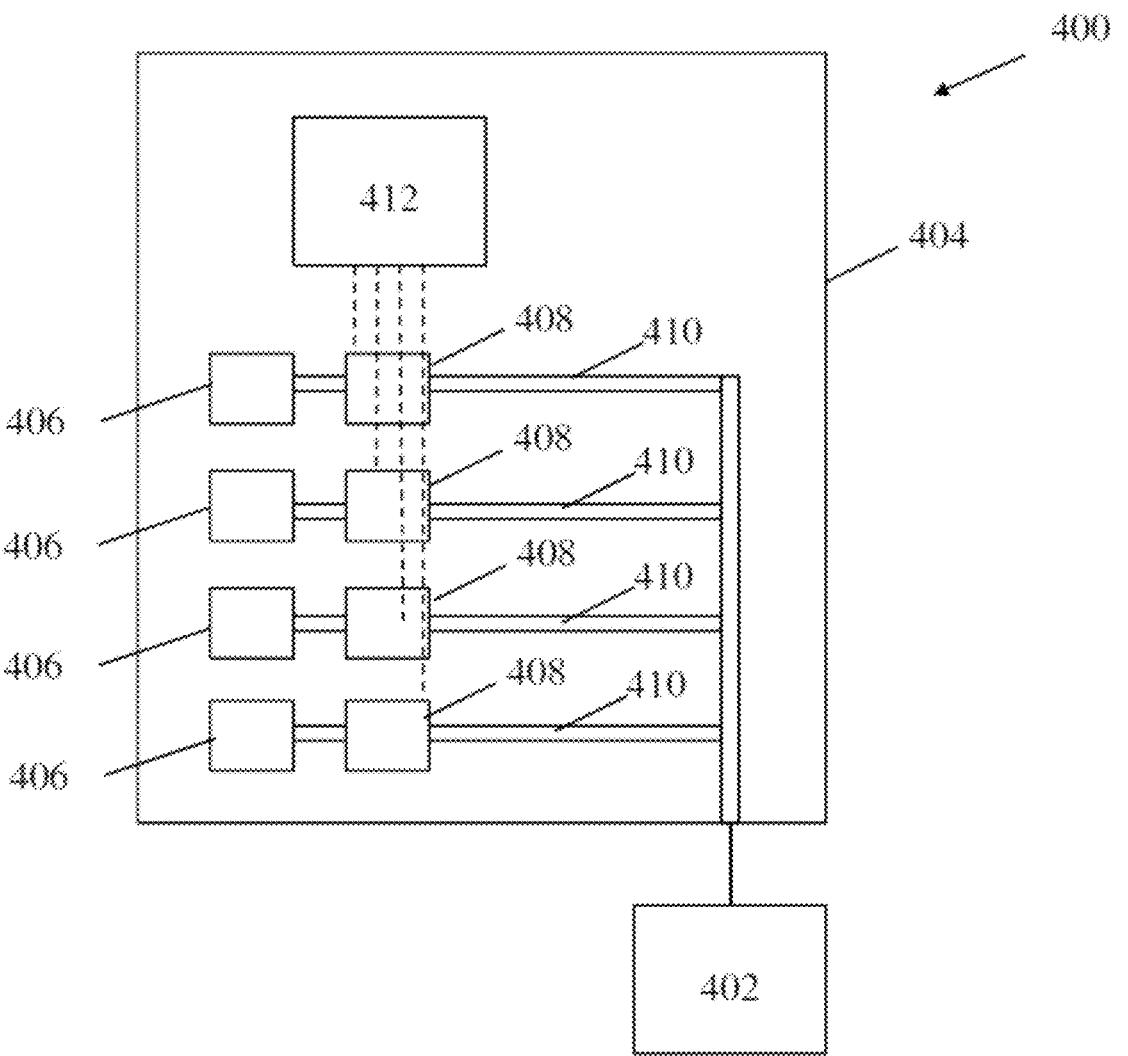
FIG. 5 depicts a further embodiment of an optical phased array assembly for use in an additive manufacturing system.

FIG. 5 depicts yet another embodiment of an OPA assembly 400 which may be utilized in an additive manufacturing system. In this embodiment, the OPA is formed on a semiconductor substrate, such as a silicon wafer. In this embodiment, laser energy from a laser energy source 402 is coupled to a semiconductor substrate 404, and the laser energy is transmitted to a plurality of emitters 406 formed on the substrate 404 via waveguides 410 formed on the substrate. For example, the emitters 406 may be configured as grating emitters configured to emit the laser energy in a direction that is substantially normal to a plane and/or surface of the substrate. Before reaching the emitters, the laser energy may be transmitted through a plurality of phase modulators 408 formed on the semiconductor substrate, and the phase modulators may be operatively coupled to a controller 412. In some instances, the controller also may be formed on the semiconductor substrate, such that the OPA assembly 400 may be formed as a single integrated component.

Figures 6A, 6B:
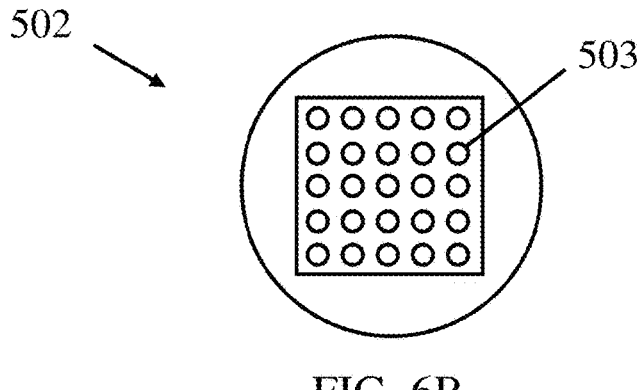
FIG. 6A depicts one embodiment of a Risley prism assembly for use in an additive manufacturing system with an optical phased array.
FIG. 6B depicts a bottom view of the optical phased array of FIG. 6A.

FIG. 6A depicts one embodiment of an additive manufacturing system 550 including an optical phased array and Risley prism assembly. In the depicted embodiment, a beam 504 output from an OPA assembly 502 may be directed toward the Risley prism assembly 500. In the embodiment of the figure, the Risley prism assembly 500 includes a first wedge prism 508*a*, a second wedge prism 508*b*, a third wedge prism 508*c*, and a fourth wedge prism 508*d*. Each wedge prism may be operatively coupled to an associated actuator. In some embodiments, a wedge prism may be coupled to an actuator through a transmission. In some embodiments, a single actuator may be coupled to a plurality of wedge prisms. In the embodiment of the figure, wedge prisms 508*a*-508*d* are coupled to actuators 509*a*-509*d* (respectively) through transmissions 510*a*-510*d* (respectively).

The first and second wedge prisms 508*a*, 508*b* form a first Risley prism pair, and the third and fourth wedge prisms 508*c*, 508*d* form a second Risley prism pair. The first and second Risley prism pairs form a dual Risley prism pair. In other embodiments, other numbers of wedge prisms may be included in a Risley prism assembly, and the disclosure is not limited to Risley prism assemblies including four wedge prisms.

In the embodiment of the figure, an input surface 520*a* of the first wedge prism 508*a* is oriented at an angle relative to an output surface 521*a* of the first wedge prism. While not labelled in FIG. 6A for clarity, each wedge prism 508*a*-508*d* includes an input surface oriented at an angle relative to an output surface. Within a Risley prism pair (e.g., first and second wedge prisms 508*a* and 508*b*, or third and fourth wedge prism 508*c* and 508*d*), the output surface of the first wedge prism of the Risley pair may be parallel to the input surface of the second wedge prism of the Risley pair, which may, in some embodiments, also be parallel to the build surface 506. However, it should be appreciated that the specific arrangement of wedge prisms and their relative orientations (and positions and orientations relative to a build surface) in FIG. 6A are an example of only one possible embodiment, and the disclosure is not limited to the embodiment of the figure.

In the embodiment of FIG. 6A, as the beam 504 output from the OPA assembly 502 passes through each wedge prism 508*a*-508*d* of the Risley prism assembly 500, the beam 504 is refracted. Rotating a wedge prism may adjust the angle at which the beam 504 exits the wedge prism. Thus, controlling both the relative and absolute rotational positions of the wedge prisms 508*a*-508*d* of the Risley prism assembly 500, the additive manufacturing system may steer the position of the beam 504 on the build surface 506 over an area that is larger than might be attainable using the OPA assembly by itself. Again, this may permit fast accurate control over both a position and shape of the laser beams directed onto the build surface.

It should be appreciated that although only a single beam 504 is depicted in the figure, any suitable number of beams arranged in any suitable arrangement may be used to provide a desired wavefront pattern or image for use with an additive manufacturing system featuring an OPA and a Risley prism assembly, as the disclosure is not limited in this regard. Additionally, while a single OPA and associated Risley prism assembly are depicted, an additive manufacturing system may include any appropriate number of OPAs and associated Risley prism assemblies that are used to coordinate large-scale scanning of the patterns output by the individual OPAs over a build surface of the additive manufacturing system.

The OPA assembly 502 may be optically coupled to one or more laser energy sources 512 (e.g., via one or more optical cables). FIG. 6B depicts a bottom view of the OPA assembly 502 of FIG. 6A, showing a plurality of pixels which may correspond to individual laser beams output by the OPA assembly. The OPA assembly 502 may also be operatively coupled to a controller 514 configured to control the phase shifters of the OPA to steer and/or shape the beam 504. The controller 514 may be additionally coupled to the actuators 509*a*-509*d* and/or transmissions 510*a*-510*d* associated with the wedge prisms 508*a*-508*d*. As noted above, in some instances, the controller may comprise a high speed FPGA coupled to the phase shifters to enable high frequency operation and control of the OPA. Further, a controller as described herein may include one or more processors and associated non-transitory processor readable memory or other media storing instructions that when executed by the one or more processors may control the systems and components described herein to perform the disclosed methods and operations.

Figure 7:
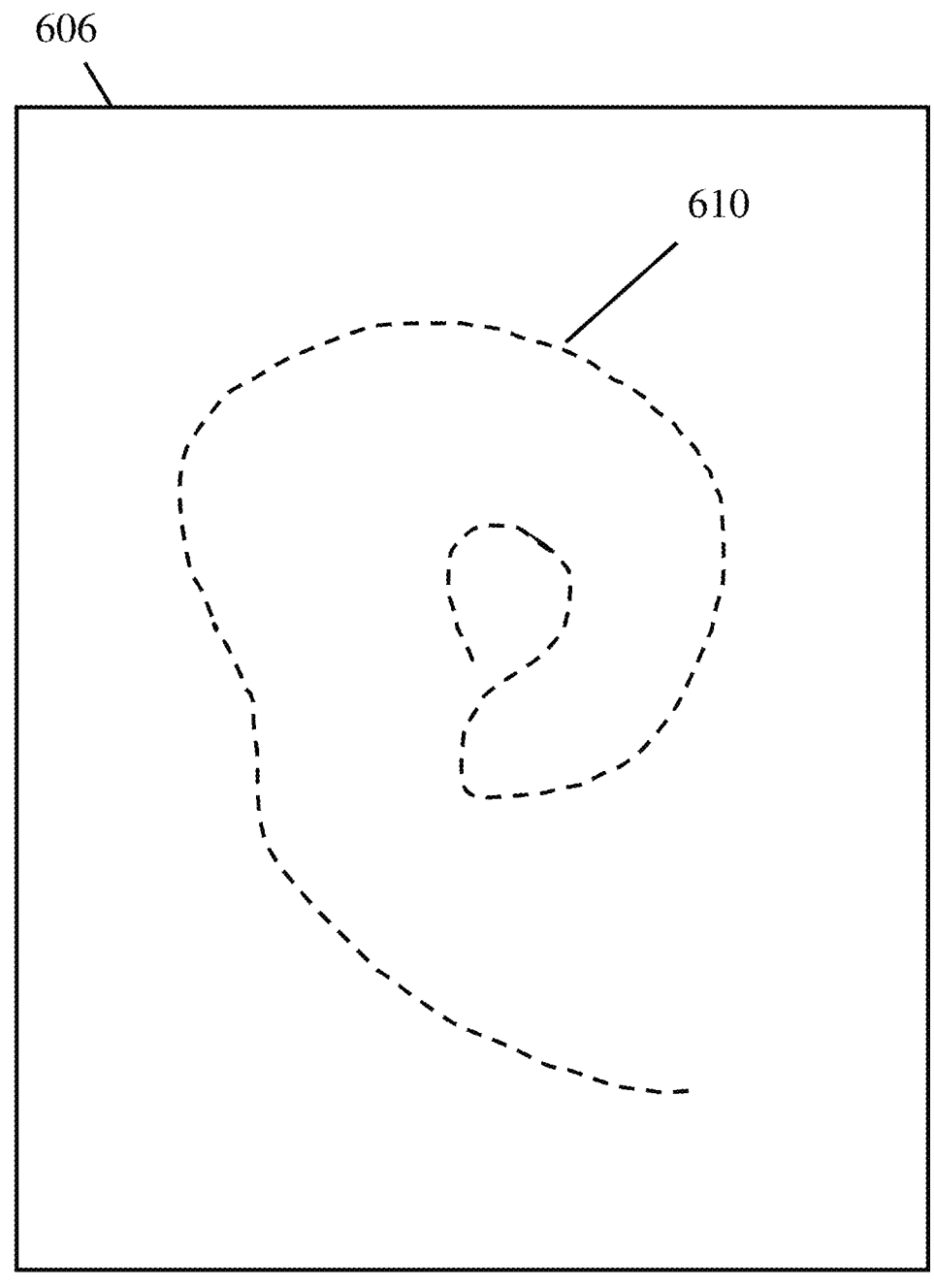
FIG. 7 depicts one embodiment of a path of a pixel across a build surface.

FIG. 7 depicts one embodiment of a path 610 of a pixel across a build surface 606 due, at least in part, to operating a Risley prism. Without wishing to be bound by theory, a Risley prism may be used to create patterns that repeat regularly, also called Rose Curves. Lines, circles, ellipses, and other shapes may be created using a Risley prism. In some embodiments, non-continuous patterns may be created, such as by rotating wedges of a Risely prism at non-constant speeds. By combining a Risley prism assembly with an OPA assembly, virtually any pattern may be achieved without restriction.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, FPGAs, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

While the present teachings have been described in conjunction with various embodiments and examples, it is not intended that the present teachings be limited to such embodiments or examples. Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. The present teachings encompass various alternatives, modifications, and equivalents, as will be appreciated by those of skill in the art. Accordingly, the foregoing description and drawings are by way of example only.

The invention claimed is:

1. A method for additive manufacturing, the method comprising:
emitting laser energy from a plurality of laser energy sources;
controlling, using an optical phased array, a phase of the laser energy emitted by each one of the plurality of laser energy sources to control a shape of at least one laser beam directed onto a build surface, wherein the optical phased array comprises a plurality of phase shifters optically coupled to the plurality of laser energy sources; and
adjusting a position of the at least one laser beam on the build surface with one or more movable wedge prisms.

2. The method of claim 1, further comprising detecting the phase of the laser energy emitted by each of the plurality of laser energy sources and controlling the phase of the laser energy emitted by each of the plurality of laser energy sources based at least partly on the detected phase of the laser energy emitted by each of the plurality of laser energy sources.

3. The method of claim 1, further comprising controlling the phase of the laser energy emitted by each of the plurality of laser energy sources to scan the at least one laser beam along the build surface.

4. The method of claim 3, further comprising scanning the at least one laser beam along the build surface at a speed of at least 10 m/s.

5. The method of claim 1, wherein adjusting the position of the at least one laser beam on the build surface with the one or more movable wedge prisms includes rotating at least one of the one or more movable wedge prisms about an axis perpendicular to the build surface.

6. The method of claim 5, wherein rotating the at least one of the one or more movable wedge prisms includes rotating at least one wedge prism of at least one pair of wedge prisms of a Risley prism assembly.

7. The method of claim 6, wherein rotating the at least one wedge prism of the at least one pair of wedge prisms of the Risley prism assembly includes rotating at least one wedge prism of two pairs of wedge prisms of a dual Risley prism pair.

8. The method of claim 1, wherein:
controlling the phase of the laser energy comprises controlling at least one high frequency phase shifter to control the phase of the laser energy emitted by each one of the plurality of laser energy sources to control the shape of the at least one laser beam directed onto the build surface, the method further comprising:
directing the at least one laser beam from the at least one high frequency phase shifter toward the one or more movable wedge prisms, and wherein:
adjusting the position comprises rotating the one or more movable wedge prisms to adjust the position of the at least one laser beam on the build surface.

9. The method of claim 1, wherein adjusting the position of the at least one laser beam on the build surface with the one or more movable wedge prisms comprises controlling a position of a first wedge prism relative to a second wedge prism to steer the position of the at least one laser beam directed onto the build surface.

10. The method of claim 1, wherein controlling the phase of the laser energy with the optical phased array and/or controlling an angular position of the one or more movable wedge prisms controls the position of one or more laser energy beams directed towards the build surface.

11. The method of claim 1, wherein each of the one or more movable wedge prisms is a planar wedge prism configured to direct wavefronts of the laser energy from the optical phased array in a single direction.

12. The method of claim 1, wherein each of the plurality of phase shifters is associated with at least one of the plurality of laser energy sources, and wherein each of the plurality of phase shifters controls the phase of the laser energy emitted by its associated laser energy source.

* * * * *